United States Patent [19]

Freeman, Sr.

[11] 4,146,993
[45] Apr. 3, 1979

[54] LIGHTING SYSTEM FOR FACILITATING PLANT GROWTH

[76] Inventor: Leslie C. Freeman, Sr., 10730 15th NE., Seattle, Wash. 98125

[21] Appl. No.: 742,547

[22] Filed: Nov. 17, 1976

[51] Int. Cl.² ............................................. A01G 7/00
[52] U.S. Cl. .................................. 47/17; 47/DIG. 6
[58] Field of Search ....................... 47/17, 58, DIG. 6

[56] References Cited

U.S. PATENT DOCUMENTS

| | | | |
|---|---|---|---|
| 2,877,340 | 3/1959 | Spaulding | 240/3 |
| 2,907,872 | 10/1959 | Wilson | 240/51.11 |
| 3,063,195 | 11/1962 | Ravich | 47/17 |
| 3,233,146 | 2/1966 | Vacha | 315/97 |
| 3,324,593 | 6/1967 | Strasser | 47/58 |
| 3,584,927 | 6/1971 | Ott | 312/126 |
| 3,673,733 | 7/1972 | Allen | 47/17 |
| 3,876,907 | 4/1975 | Widmayer | 47/DIG. 6 |
| 3,930,335 | 1/1976 | Widmayer | 47/DIG. 6 |
| 3,931,695 | 1/1976 | Widmayer | 47/DIG. 6 |

FOREIGN PATENT DOCUMENTS

| | | | |
|---|---|---|---|
| 240638 | 10/1964 | Austria | 47/DIG. 6 |
| 932961 | 9/1973 | Canada | 47/59 |
| 961315 | 3/1957 | Fed. Rep. of Germany | 47/DIG. 6 |

OTHER PUBLICATIONS

Devlin, Robert M. (1966), *Plant Physiology*, Reinhold Book Corp., p. 226.
Meyer, B. et al. (1960), *Introduction to Plant Physiclogy*, D. Van Nostrand Co. Inc., pp. 380-395.
Anon., *Science News Letter*, "Rotate Light Bulbs for Winter Growth", Sep. 1955 (p. 151 only).
Meyer, B. S. et al., (Portion of) Chapter 36, "Plant Movements", *Plant Physiology*, 3, 1965, D. Van Nostrand and Co. Inc., N.Y., pp. 736-745.
Leopold, C. A., *Plant Growth and Development*, 1964, McGraw-Hill Book Company, N.Y., pp. 344 and 345.
Bickford, E. D. et al., *Lighting for Plant Growth*, 1973, Kent State University Press, pp. 15-45, 109 and 167-181.

*Primary Examiner*—Edgar S. Burr
*Assistant Examiner*—James R. Feyrer
*Attorney, Agent, or Firm*—Seed, Berry, Vernon & Baynham

[57] ABSTRACT

A method and apparatus for facilitating plant growth in which light is alternately directed at the plants from at least two directions. The frequency at which the light is shifted between directions is sufficiently low to allow the plant to react to the light source before the direction of illumination is shifted thereby increasing the growth rate of the plant. In one embodiment, the lights are arranged in two parallel rows above the plants with the rows longitudinally offset from each other so that the lights in each row are directly opposite the midpoint between lights of the other row. Each row is connected in a separately energized circuit so that as the circuits are alternately energized the light is directed onto the plants from at least two discrete directions. The number of lights required for the system is dictated by generally accepted illumination standards for specific plants, yet the operating costs of the system are significantly lower than conventional systems since only half of the lights are illuminated at a time.

5 Claims, 5 Drawing Figures

LIGHTING SYSTEM FOR FACILITATING PLANT GROWTH

BACKGROUND OF THE INVENTION

1. Field of the Invention

This invention relates to lighting systems and, more particularly, a greenhouse lighting system which has a low operating cost and which grows plants at an accelerated rate.

2. Description of the Prior Art

Artificial light has long been used both experimentally and commercially to provide supplemental or total light for plants. The light has generally been of a spectrum which is most suitable for plant growth produced by relatively efficient lamps which have a relatively high lumen per watt ratio. These systems generally utilize a number of point light sources spaced apart above the plants. The number of lamps used in these conventional lighting systems as well as the spacing of the lamps from each other and from the plants is selected to place a specific intensity of light on the plants. However, light received by the plants is not constant since the plants closer to the light sources receive light of a higher intensity. The variations in light received by the plants result in a non-uniformity of growth or a "wave formation." One technique which has been employed to eliminate "wave formation" has been to continuously move the light sources above the plants so that the average intensity of the light received by the plants is relatively constant. These systems generally mount a lamp on an elongated track with the lamp continuously moving along the track at a constant rate. Alternatively, the lamp is mounted in a fixed position, and the illumination angle of the lamp is varied. It should be emphasized that in these systems the light is moved at a fairly high rate of change and although it is well known that artificial light will accelerate plant growth, many attempts have been made to optimize the growth rate from artificial light by practicing a variety of techniques for directing the light onto the plants. Some experimenters have determined that light applied in a relatively short burst or flash will stimulate growth at a reduced energy cost since the light is on for only a portion of the time period. A serious problem with this technique is the general unavailability of lights which will operate at the flashing speed required. To alleviate this problem to some extent, experimenters have resorted to a complicated and highly sophisticated system of special light sources, controls, and other devices to provide the necessary flashing or intermittent light. Such systems are extremely expensive and unduly complex.

SUMMARY OF THE INVENTION

It is an object of the invention to provide a relatively inexpensive, artificial lighting system for growing plants at an accelerated rate.

It is another object of the invention to provide a greenhouse lighting system having significantly lower operating costs than conventional lighting systems.

It is another object to provide an intermittently energized lighting system which does not reduce the life of such system components as lamps and ballasts below their normal, operating lives.

It is still another object of the invention to provide an artificial lighting system for stimulating plant growth which operates automatically without the requirement of operator input.

These and other objects of the invention are accomplished by a method and apparatus for facilitating plant growth by alternately directing light toward the plants from at least two discrete directions. The frequency at which the light is shifted from one direction to the other is sufficiently low to allow the plants to react to changes in lighting direction but not long enough to cause permanent change, thereby causing the plants to grow at an accelerated rate. The light may be shifted between positions by providing a plurality of spaced apart lamps arranged in two separately energized circuits or, alternatively, the plants or a light may be moved between two discrete positions. In the embodiment where separately energized circuits are utilized, both circuits are driven by the same ballast so that the ballast operates continuously without intermittent surges which would shorten the life of the lamps and ballast. The system may be manually controlled, or automatic control circuits may be provided for actuating the system within a predetermined time frame or during predetermined levels of natural light. The inventive system utilizes approximately the same number of lamps as conventional systems, yet its operating costs are about half the operating costs of conventional systems since only half of the lamps are powered at a time.

DETAILED DESCRIPTION OF THE INVENTION

It is well known that plants react to light by bending in the direction of prevailing sunlight. This response is highly apparent in the sun flower, some trees, and in broad-leaf plants. A similar response is noted when plants are near a narrow window of light such as in a house, and such plants are normally rotated occasionally to prevent the plant from leaning to one side.

The mechanics of the apparent movement are fully described in current botany texts such as Devlin, Robert N. *Plant Physiology* 1966, pp. 226-27 and Myer, Anderson and Bohning, *Introduction to Plant Physiology* 1960, pp. 385-89. It is important to recognize that a plant is capable of responding to variations in light direction at a somewhat limited rate. Relatively high frequency variations in plant illumination direction do not allow sufficient time for the response. On the other hand, shifting the position of the light source at too infrequent a rate can cause a permanent lengthening of the cell. A single, more powerful source of light will prevent stretch, but also will reduce chemical movement to diffusion rates rather than the higher rates caused by movement of a light source such as the sun.

Figure 1:
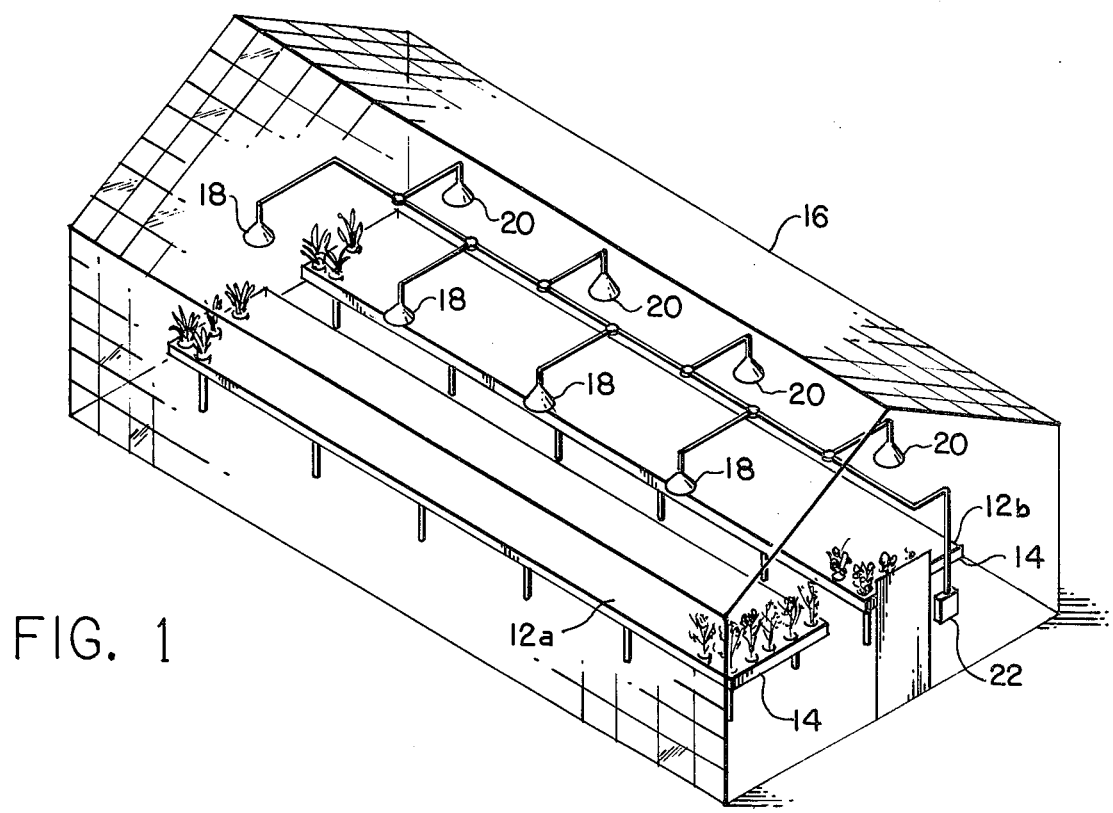
FIG. 1 is an isometric view of one embodiment of the lighting system installed in a greenhouse.
Figure 2:
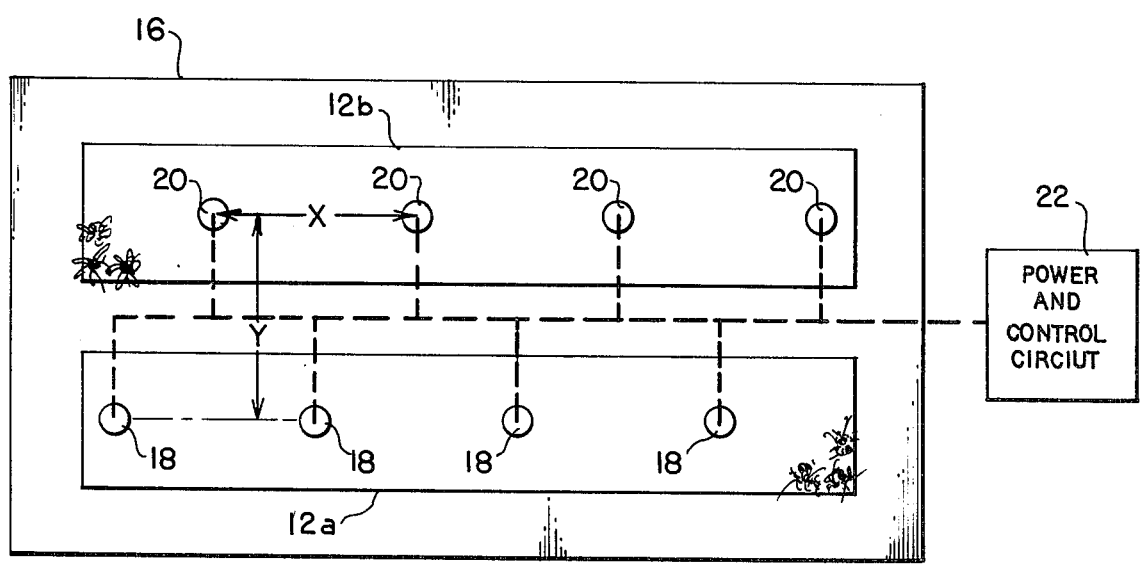
FIG. 2 is a top plan view of the greenhouse lighting system of FIG. 1.

The basic concept of the inventive greenhouse lighting systems described herein is to direct light toward a plant or plants from at least two discrete directions at a frequency which is sufficiently low to allow the plant to react in response to the shifting light source yet sufficiently frequent to optimize the reaction rate and hence the rate of growth. One embodiment for carrying out this concept is illustrated in FIGS. 1 and 2. Beds of plants 12 supported on growing tables 14 are enclosed by a conventional greenhouse 16. A plurality of lamps 18,20 are supported above the plants 12 in two parallel rows with the lamps in one row 18 connected together in one separately energized circuit and the lamps in the other row 20 connected together in a second separately energized circuit. The first row of lamps 18 is positioned above one bed of plants 12a while the second row of lamps is positioned along the other bed of plants 12b. All of the lamps 18,20 are connected to a power and control circuit 22 which, as explained hereinafter, alternately energizes the separate circuits connected to the lamps 18,20.

The lamps 18,20 in each row are separated by a distance X while the rows are separated from each other by a distance Y. Although the values of X and Y may vary depending upon specific applications of the greenhouse lighting system, in one operational embodiment of the system the lamps in each row as well as the rows themselves are placed nine feet apart from each other, and the lamps 18,20 are placed approximately five feet above the plants 12. Although a variety of lamps may be used with the lighting system, Westinghouse H33GL400/R lamps placing from 200 to 300 foot candles on the plants have been advantageously used. A conventional lighting system having its lamps positioned to place 200 to 300 foot candles on the plants would be using about 2 watts per square foot. The inventive lighting system is able to achieve superior growth using the same lamp positioning with a power consumption of only about 1 watt per square foot since only half of the lights are powered at a time. Consequently the inventive lighting system grows plants at a faster rate and at a significantly lower cost than conventional lighting systems.

The lighting system generally is not in continuous use, but instead is de-energized for a short period during the evening. Although the duration of the de-energized period may vary with the specific application of the lighting system, a 4 to 6-hour de-energized period producing an 18 to 20-hour day has found to yield the most desirable results for one specific embodiment of the invention described herein. Also, it may be desirable to deactivate the system when natural light levels from the sun exceed a predetermined value.

Figure 3:
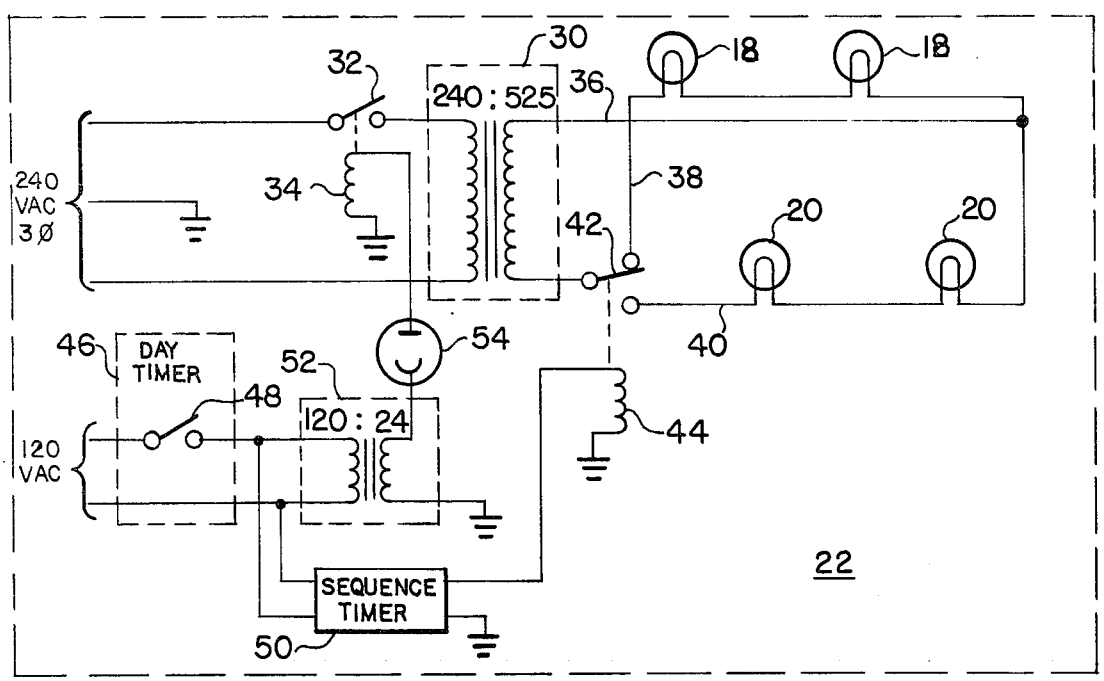
FIG. 3 is a schematic of the electrical control system for the lighting system of FIGS. 1 and 2.

A schematic of the power and control circuit 22 of FIG. 2 is illustrated in FIG. 3. Single-phase AC power at 240 volts is applied to a ballast 30 through a relay contact 32 so that when the relay solenoid 34 is energized, 525 volts AC is present across the secondary of the ballast 30. One lead of the ballast secondary is a common line connected to both bulb circuits through line 36 while the other secondary is alternately connected to the first circuit 38 or the second circuit 40 through a relay contact 42. The relay contact 42 is controlled by a relay solenoid 44 which, in its unenergized position, connects the relay contact 42 with line 38 thereby energizing the lamps 18 in the first row. In its energized condition, the relay solenoid 44 connects the contact 42 with the line 40 thereby applying power to the lamps 20 in the second row. Thus when the relay solenoid 34 is energized, the lamps 18 or 20 in one of the rows will always be energized depending upon the position of the relay contact 42 responsive to energization of the relay solenoid 44. The operation of the relay solenoids 34,44 is controlled by the remaining circuitry in the power and control circuit 22 which is connected to a source of 120 volt AC power through a conventional daytimer 46 which closes a contact 48 during a predetermined period of each day. The output of the daytimer 46 is connected to both a sequence timer 50 and a 120:24 step-down transformer 52. The sequence timer 50, which may be a commercially available timing device, is set to periodically energize the relay solenoid 44 to alternately energize each of the rows at a frequency which provides optimum growth stimulation of the plants 12 in the greenhouse 16. It has been found that this frequency may be between 1 and 6 hours so that the lamps in each row are illuminated for a period of from ½ to 3 hours before the opposite row is energized. The exact rate will depend on plant response to a given power of light. One operational system has shown good response with a 4-hour cycle which illuminates one row for two hours and then the adjacent row for two hours. The secondary of the transformer 52 is connected to a conventional photocell 54 having an internal contact which is normally closed when light received by the photocell is below a predetermined value. The photocell 54 is placed in a position adapted to receive natural light from the sun so that when the natural light exceeds a predetermined value, the internal contact opens thereby de-energizing relay solenoid 34 and removing power from the ballast 30 to de-energize the system. In summary, the power and control circuit 22 alternately energizes the lamps 12 in each of the rows at a frequency determined by the sequence timer 50 for a predetermined period of each day as set by the daytimer 46 when the intensity of the natural light from the sun is below a predetermined level as sensed by the photocell 54. It will be understood, however, that alternate switching systems, some of which may require manual input from an operator, may be devised to accomplish the same or similar functions.

Figures 4, 5:
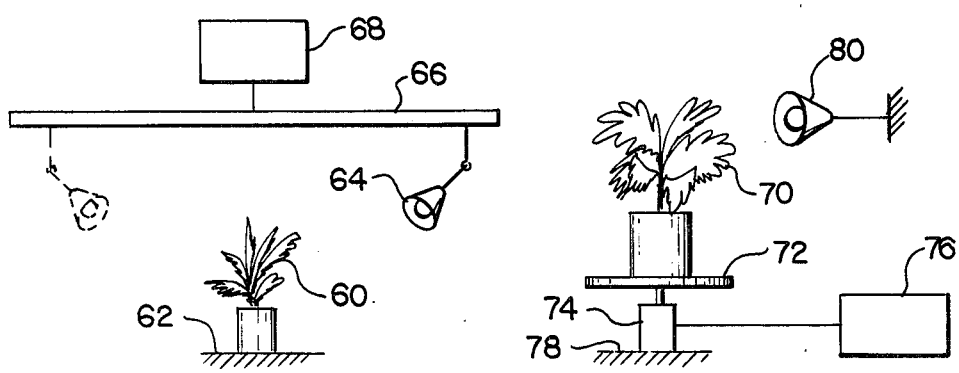
FIG. 4 is a schematic of an alternate embodiment of the lighting system.
FIG. 5 is a schematic of another alternate embodiment of the lighting system.

Schematics of other embodiments of the greenhouse lighting system are illustrated in FIGS. 4 and 5. In FIG. 4 a plant 60 placed on a stationary growing table 62 receives light from a lamp 64 which is movably mounted on a conventional carriage 66 suspended above the plant 60. The carriage 66 is adapted to move the lamp 64 from one end of the carriage 66 to the other as shown in phantom while rotating the lamp so that it faces the plant 60 at all times. The movement of the lamp 64 on the carriage 66 is accomplished by conventional carriage control circuitry 68. It should be emphasized that the lamp 64 moves fairly rapidly between ends of the carriage 66 where it remains for a substantial period of time so that, unlike conventional lighting systems utilizing movable lamps, light is directed at the plant 60 from two discrete directions.

In the system illustrated in FIG. 5, a plant 70 is supported on a turntable 72 which is rotatably driven by a motor 74 which may be a stepping motor driven by conventional motor control circuits 76. The motor 74 is supported on a stationary table 78. A single, stationary lamp 80 directs light onto the plant. The turntable 72 remains stationary for a substantial period of time, for example, ½ to 3 hours, and then quickly rotates so that light from the lamp 80 strikes the plants 70 at a different angle. The turntable 72 then remains in the second position for ½ to 3 hours before returning again to the original position. Thus it is seen that the position of the light source with respect to the plant may be varied by alternately switching two or more circuits of stationary lamps, by moving a single lamp between fixed positions, or by utilizing a stationary lamp and moving the plant itself. In either case, the plant reacts toward the source of light thereby causing fluid flow between cells which causes the plants to grow at an accelerated rate.

The embodiments of the invention in which a particular property or privilege is claimed are defined as follows:

1. An apparatus for facilitating plant growth, comprising:
   a first plurality of electric lamps interconnected by a first circuit such that all of said lamps are illuminated when said first circuit is energized, said lamps being spaced apart along a first row above plants to be illuminated;
   a second plurality of electric lamps interconnected by a second circuit such that all of said lamps are illuminated when said second circuit is energized, said second plurality of lamps being spaced apart along a second row parallel to and spaced from said first row by a distance such that the light from said first and second plurality of lamps strikes said plants on substantially opposite sides, the lamps of each plurality of lamps being spaced along said first and second rows approximately equidistant from adjacent lamps with the lamps in the two rows being offset so that, in the direction of the rows, the lamps of one row are located substantially equidistantly between the lamps of the other row; and
   control means for automatically energizing said first and second circuits at a cycle duration of between 1 hour/cycle and 6 hours/cycle such that each of said circuits are energized for a period of between ½ and 3 hours/cycle to allow said plants to react in response to light from said alternately energized lamps.

2. The apparatus of claim 1, wherein said lamps are spaced 9 feet apart from adjacent lamps in their respective rows, and said rows are spaced 9 feet apart from each other.

3. The apparatus of claim 1, further including timer means for actuating said control means during a period of approximately 18 to 20 hours each day to maximize the growth rate of said plants.

4. The apparatus of claim 1, further including ambient light-sensing means for deactivating said control means when ambient light from the sun exceeds a predetermined value.

5. The apparatus of claim 1, wherein each of said circuits is energized for a period of between 60 and 90 minutes to maximize the reaction of said plants.

* * * * *